United States Patent

[11] 3,619,802

[72] Inventor Dieter R. Lohrmann, Eatontown, N.J.
[21] Appl. No. 826,114
[22] Filed May 20, 1969
[45] Patented Nov. 9, 1971
[73] Assignees The United States of America as represented by the Secretary of the Army

[54] FREQUENCY SYNTHESIZER

5 Claims, 2 Drawing Figs.

[52] U.S. Cl. 331/4, 331/19, 331/25, 331/178
[51] Int. Cl. H03b 3/04
[50] Field of Search 331/4, 14, 18, 19, 25, 178

[56] References Cited

UNITED STATES PATENTS 3,375,461 3/1968 Ribour et al. 331/4

OTHER REFERENCES

Lohrman et al., " Cut Synthesizer Current Consumption" Electronic Design 25, Dec. 5, 1968, pp. 80- 83; 330- 19

*Primary Examiner*—John Kominski
*Assistant Examiner*—James B. Mullins
*Attorneys*—Harry M. Saragovitz, Edward J. Kelly, Herbert Berl and Daniel D. Sharp

ABSTRACT: A digital frequency synthesizer using a sampling principle for phase locking a variable frequency oscillator to a desired one of several spectral lines of a series of accurately obtainable spectrums created by a standard frequency source such that the line to which the oscillator has to be locked is determined by successively counting a predetermined number of spectral lines of each spectrum, starting from the known reference point at each spectrum established by using another one of said spectrums with lines spaced farther apart in frequency than the spectral lines of the given spectrum, the counting being done without opening the oscillator phase lock loop and by imposing a slow frequency drift on the variable frequency oscillator, thus beating it with successive lines of a given spectrum and deriving an output from the counting means for counting lines of the spectrum of closest frequency spacing, terminating the sweep of the variable frequency oscillator frequency and locking onto the desired spectral line of said spectrum of closest spacing which is that line reached by the variable frequency oscillator when the predetermined count has been achieved. Steadiness and accuracy in pulling the variable frequency oscillator frequency controlloop is achieved by a diode used in conjunction with the sweep circuit for the variable frequency oscillator.

INVENTOR.
DIETER R. LOHRMANN
BY: Daniel D. Sharp, Harry M. Saragovitz, Edward J. Kelly & Herbert Berl
ATTORNEYS.

FREQUENCY SYNTHESIZER

The invention described herein may be manufactured, used, and licensed by or for the Government for governmental purposes without the payment to me of any royalty thereon.

BACKGROUND OF THE INVENTION

Prior digital high-frequency synthesizers using a variable frequency oscillator as part of a locked loop select the frequencies by varying the dividing ratio of a divide-by-N-counter. Such counters, usually involving flip-flops, consume considerable energy at high counting speed, and the higher the frequency, the greater the power consumed by the counter.

SUMMARY OF THE INVENTION

The normally high current drawn by present digital frequency synthesizers, operating in the very high frequency range and above, can be decreased drastically by avoiding the use of high speed counters. In the system of the invention, a low-frequency reference oscillator is used to generate a spectrum of accurate frequencies and a voltage-controlled oscillator is phase locked to one of these frequencies. In one embodiment of the invention, 460 very high frequency receiving channels between 41.5 and 64.5 MHz. spaced at 50 kHz. are provided which drew only 53 milliwatts of power, excluding the power consumption of the voltage-controlled oscillator.

The spectrum of accurate marker frequencies can be created by a source of short pulses, such as a blocking oscillator, or a step recovery diode, triggered by a highly accurate crystal-controlled oscillator. The resulting train of very short pulses is rich in harmonics which form the required markers. The spacing between the markers, and hence, the channel spacing of the synthesizer, is determined by the pulse repetition rate and the accuracy results from using the stable crystal oscillator to trigger the pulse source. In order to lock the voltage-controlled oscillator, otherwise referred to as the variable frequency oscillator, onto the desired marker, with this technique, one must identify the desired spectral component or marker out of the many available and lock the variable frequency oscillator onto it. The variable frequency oscillator is first locked onto a coarse frequency marker, such as an integer MHz marker in the vicinity of the frequency to which the variable frequency oscillator is to be set, by means of a phase lock loop which includes a phase discriminator supplied with output pulses from the blocking oscillator and the output of the variable frequency oscillator. The discriminator output serves as a control signal which, after suitable amplification and filtering, is supplied to the voltage variable capacitors in the variable frequency oscillator. The free running variable frequency oscillator initially is tuned with an accuracy of at least ±450 kHz., in the case of a spectrum of 1 MHz. frequency spacing, to approximately the desired MHz marker frequency by conventional tuning control. The variable frequency oscillator then is preset to 500 kHz. (half of 1 MHz.) either above or below this particular MHz. marker and then is swept either downwardly or upwardly, depending on whether channels below the integer MHz line or above are to be reached. The variable frequency oscillator first is locked by the phase lock loop to the MHz marker nearest the desired channel or marker. During this time, the blocking oscillator is triggered directly by the crystal oscillator operating at 1 MHz., for the example given. A beat note detector produces an output when the variable frequency oscillator falls into lock. A short time after the first lock has been achieved, the variable frequency oscillator is pulled out of lock again by the sweep. While it is unlocked a divide-by-N-counter is switched in between the 1 MHz crystal oscillator and the blocking oscillator. For example, N may have a value of twenty. Therefore, the blocking oscillator is now triggered at a 1 MHz.:20=50 kHz. rate. The power consumption of this divide-by-20 frequency divider is typically 3.5 milliwatts. As the variable frequency oscillator continues to be swept in frequency, the phase lock loop continues to be pulled out of lock, creating beat notes at the output of the discriminator each time a 50 kHz. marker is encountered. The number of 50 kHz. increments by which the variable frequency oscillator is removed from the frequency marker at which the first lock is attained is indicated by the number of pulses from the beat note detector (that is by the number of times that the variable frequency oscillator is pulled out of and into lock). The output of the beat note detector is fed into a beat note counter into which is preset a count corresponding to the exact 50 kHz. frequency marker desired. When the preset count is reached, (the number of counts preset equals the number of channels away from the 1 MHz. marker, plus the count which is registered as the circuit locks to this MHz. marker). The counter then provides an output pulse which turns off the sweep circuit for the variable frequency oscillator and the frequency at which the variable frequency oscillator now is locked is assured of being the desired frequency of the variable frequency oscillator.

Although the invention has been explained as involving two frequency spectra, any number of spectra may be used, depending on the accuracy required.

DETAILED DESCRIPTION OF THE PREFERRED EMBODIMENT

Figures 1, 2:
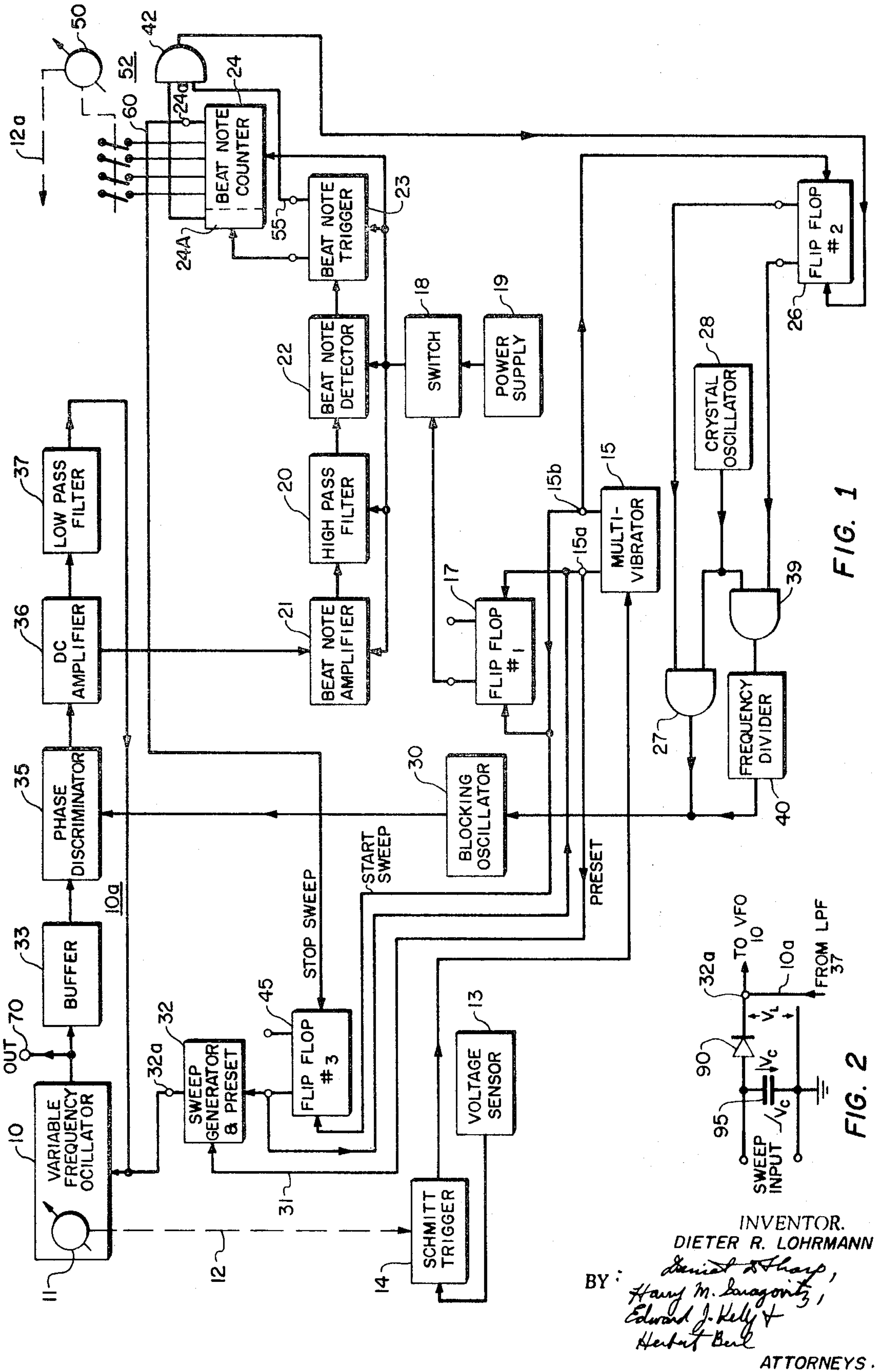
FIG. 1 is a block diagram showing an embodiment of the invention.
FIG. 2 illustrates a circuit which can be used with the sweep generator 32 of FIG. 1.

Initially, the variable frequency oscillator 10 of FIG. 1 is set to approximately the desired frequency value (for example, to the nearest MHz, such as 43 MHz.) by a control knob 11. As will be explained more fully later, the equipment also includes fine frequency adjustment 50. Operating this control knob starts the tuning procedure by delivering a "start tuning " command pulse to Schmitt Trigger 14 via line 12. Presetting can be done with reasonable accuracy and, in fact, it is necessary that the variable frequency oscillator be adjustable to an accuracy of just under ±500 kHz. in order for the synthesizer not to lock on an undesired MHz. spectral line. If the synthesizer is turned on, or if the DC supply voltage changes appreciably, this is sensed by a voltage sensor 13 and causes a Schmitt trigger 14 also to produce an output pulse which triggers the tuning procedure. If either or both of the frequency control knobs 11 and 50 kHz. operated, this also is communicated, as indicated by the respective dashed lines 12 and 12*a*, to the Schmitt trigger 14 and also is responsible for an output pulse being derived from Schmitt trigger. When the control knob 11 is moved to set the variable frequency oscillator frequency to, say 43 MHz. the Schmitt trigger pulse triggers a multivibrator 15 and a pulse of about 50 milliseconds duration is produced at the complementary output terminals 15*a* and 15*b* of the multivibrator 15. The pulse from the terminal 15*a* of the multivibrator resets the first flip-flop 17 and opens switch 18 connecting the power supply 19 to the beat note amplifier 21, the beat note detector 22, the beat note trigger 23 and the beat note counter 24. Also, it storages the binary number *n* into a beat note counter 24. This binary number *n* is derived from digital switch assembly 52, which is operated by the ×50 kHz. frequency control knob 50. In addition, multivibrator 15 sends an override signal to the sweep generator 32 via preset line 31, thereby presetting the variable frequency oscillator (VFO) 10 to 500 kHz. below (or above) the integer MHz. frequency (e.g. 43 MHz.), such that the variable frequency oscillator now delivers approximately 42.5 MHz. After about 50 ms., the monostable multivibrator 15 falls back into its stable state, thus removing the overriding preset signal from line 31, thereby enabling sweep generator 32 to start sweeping the frequency of variable frequency oscillator 10 either upwards or downwards. The output of variable frequency oscillator 10 is supplied to phase discriminator 35 through buffer 33. The other input terminal of 35 is fed by crystal-controlled 1 MHz. pulses from blocking oscillator 30.

The latter is triggered by 1 MHz. crystal oscillator 28 through gate 27.

When the upward sweeping variable frequency oscillator frequency reaches the 43.000 MHz. spectral line produced by blocking oscillator 30, the phase discriminator 35 turns out a direct current signal, which, through DC amplifier 36 and low-pass filter 37, is fed to a frequency control element in variable frequency oscillator 10 thus closing frequency-locking loop 10*a* in known manner. The variable frequency oscillator is locked now to 43.000 MHz. If this was the frequency desired, the number *n* which was storaged into the beat note counter 24 would be zero. Therefore, the pulse being provided by the beat note trigger enters directly output line 60 of the beat note counter 24, thus turning off sweep generator 32 via flip-flop 45. Beat note trigger 23 is activated by beat note detector 22. Beat note detector 22 senses, when the AC component on the frequency control loop has disappeared, signalling that the variable frequency oscillator has fallen into lock, Beat note detector 22 is fed by beat note amplifier 21 and high pass filter 20. When flip-flop 45 turns off the sweep, it also turns off the components 21, 22, 23, 24 by resetting flip-flop 17, opening switch 18 in order to save power.

If this was not the frequency desired, that is, if the number *n* storaged into beat note counter 24 by the ×50 kHz. control knob was different from zero, say, 7, then flip-flop 45 is not triggered when the variable frequency oscillator falls into the first lock. Thus sweep generator 32 stays on, after some time pulling the variable frequency oscillator out of the 43.000 MHz lock. When this happens, there will be AC on the phase lock loop. This AC will be sensed by beat note detector 22 (via 21 and 20), which activates beat note trigger 23. MHz. note trigger 23, when initially activated, sends a pulse on line 55 through gate 42 to flip-flop 26. When flip-flop 26 is set, it will open gate 39 and interrupt gate 27, such that the 1 MHz. signal from the crystal oscillator 28 is now routed through gate 39 and the divide-by-20 frequency divider 40 to the blocking oscillator 30. Therefore, the phase discriminator 35 now receives pulses with a 50 kHz. repetition rate. All this happens during the time when the loop is unlocked for the first time after the 43.000 MHz. lock. This way, transients on the loop 10*a*, caused by switchover from 1 MHz to 50 kHz. spectrum are immaterial since the loop carries AC anyway at that time. The output of the first stage 24A of the beat note counter 24 was supplied to AND-gate 42 together with the output on line 55 of the beat note trigger 23, to permit the second flip-flop 26 to be switched from the "1 MHz" side to the "50 kHz." side only after attaining the first locked point of the variable frequency oscillator. In due time, the variable frequency oscillator will fall then into the lock point 43.050 MHz. When this happens, the beat note detector 22 will sense that the AC component disappeared from loop 10*a* and will retrigger beat note trigger 23. Beat note trigger 23 then sends a pulse to beat note counter 24, thus reducing the number *n* that was storaged into 24 originally by 1, reducing *n* to 6. After this, the variable frequency oscillator is pulled out of the 43.050 MHz. lock, providing a next pulse to beat note counter 24, when it falls into the 43.050 MHz. position. Now *n* is reduced by 2, that is, to say 5. This process is repeated until *n* is reduced to zero. At this time then the variable frequency oscillator will be locked to 43.350 MHz. When beat note counter 24 reaches zero count, it resets flip-flop 45 via line 60. Thereby the sweep generator 32 is turned off, which also reset flip-flop 17, removing power from components 21, 22, 23 and 24. Now the tuning cycle is completed. The frequency appearing at output terminal 70 is now 43.350 MHz., as was desired.

In order to pull the variable frequency oscillator in a predictable manner, even though the locking loop is active during the pulling, a diode 90 is used in conjunction with the sweep circuit capacitor 95, as shown in FIG. 2. As current flows through capacitor 95 a voltage sawtooth waveform $V_c$ is generated. When this voltage $V_c$ reaches the voltage $V_L$ on the phase lock loop corresponding to the frequency of the variable frequency oscillator then existing, diode 90 starts conducting and the frequency control loop tries to counter the increasing current at point 32*a* owing to conduction of diode 90 until the holding limit is reached. At that point, the frequency of the variable frequency oscillator 10 jumps upwardly into the next locking position, whereupon the voltage $V_L$ increases correspondingly by an amount sufficient to reverse bias diode 90. The continually rising sawtooth voltage $V_c$ rises further until it again reaches the new value of $V_L$, starting conduction again in diode 90. The diode bias, equal to $V_L$ minus $V_c$, corresponds to the 50 kHz. increase in frequency.

Further circuit details of the system shown in FIG. 1 can be found in an article by D. R. Lohrmann and Arthur R. Sills entitled "cut Synthesizer Current Consumption." appearing at pages 80–83 of Electronic Design, Volume 16, Number 25, Dec. 5, 1968.

What is claimed is:

1. A frequency synthesizer comprising
a variable frequency oscillator to be operated at a desired accurate frequency;
standard generating means for providing a multiline spectrum with said spectral lines being spaced apart by a known frequency;
means for providing a reference frequency lying within said spectrum;
means for sweeping the frequency of said variable frequency oscillator across said frequency spectrum in the direction of said desired frequency starting from said reference frequency;
circuit means for phase locking said variable frequency oscillator to said spectral lines encountered during said sweep and providing a pulse whenever the frequency of said variable frequency oscillator coincides with a given one of said spectral lines;
said means for providing a reference frequency being coupled to said phase crossed circuit means;
counting means responsive to said pulses for counting the number of spectral lines crossed during said sweep;
said counting means having a predetermined count preset therein equal to the ratio of the frequency departure of said desired frequency from said reference frequency and the frequency spacing of said multiline spectrum;
and means coupled to said counting means responsive to attainment in said counter of said predetermined count for disabling said sweeping means.

2. A frequency synthesizer according to claim 1 wherein said means for providing a reference frequency comprises means for generating a series of harmonics spaced apart in frequency by a multiple of said known frequency and including a particular harmonic of frequency nearest to the frequency to which said variable frequency oscillator initially is set;
means for presetting said variable frequency oscillator to a preset frequency displaced from the particular frequency of said variable frequency oscillator by less than half of said multiple; and
means for decoupling said series of harmonics from said circuit means and coupling said multiline spectrum to said circuit means in response to locking of said variable frequency oscillator to said particular harmonic.

3. A frequency synthesizer as recited in claim 1 wherein said sweep means for sweeping includes means for varying the frequency of said oscillator in either direction.

4. A frequency synthesizer as recited in claim 1 wherein said means for sweeping includes a capacitor across which a voltage ramp is generated, and a diode interconnecting said capacitor and a point on said control loop, said diode being reverse biased as each of said harmonics is swept over.

5. A frequency synthesizer comprising
reference generator means for providing a spectrum of harmonics spaced apart by a known frequency;
a variable frequency oscillator to be operated at a desired accurate frequency and tuned to an initial frequency approximating said desired frequency within an accuracy of slightly less than half said known frequency;

said variable frequency oscillator and said generator means forming part of a continuously closed phase lock loop comprising means for locking said variable frequency oscillator to various ones of said harmonics;

means for presetting said variable frequency oscillator to a preset frequency differing from said initial frequency by said known frequency;

sweep means activated subsequent to attainment of said preset frequency for sweeping the frequency of said variable frequency oscillator across said harmonic spectrum in the direction of said desired frequency;

said phase lock loop including means for deriving a distinctive control lock signal each time said variable frequency oscillator frequency coincides with one of said harmonics during said frequency sweeping;

means coupled to said phase lock loop for providing an unlock pulse during that portion of the sweeping interval that said variable frequency oscillator is first pulled out of lock with the first harmonic swept through;

transfer means responsive to said unlock pulse for decreasing the spacing of the harmonics of the harmonic spectrum from said generator means across which said variable frequency oscillator is swept by a desired factor;

trigger means producing a trigger pulse in response to each control lock signal as said variable frequency oscillator is swept past said harmonic spectrum;

counting means receptive of said trigger pulses and preset to count a predetermined number of pulses equal to the frequency departure of the desired frequency from the initial frequency and the frequency spacing of the harmonic spectrum;

and means for disabling said sweeping means in response to counting of said predetermined number of trigger pulses by said counter means.

* * * * *